US012763913B2

(12) United States Patent
Lee et al.

(10) Patent No.: US 12,763,913 B2
(45) Date of Patent: Oct. 13, 2026

(54) METHOD AND DEVICE FOR PERFORMING UPLINK TRANSMISSION AND RECEPTION IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 18/291,730

(22) PCT Filed: Aug. 5, 2022

(86) PCT No.: PCT/KR2022/011616

§ 371 (c)(1),
(2) Date: Jan. 24, 2024

(87) PCT Pub. No.: WO2023/014142

PCT Pub. Date: Feb. 9, 2023

(65) Prior Publication Data

US 2024/0380556 A1 Nov. 14, 2024

(30) Foreign Application Priority Data

Aug. 5, 2021 (KR) ........................ 10-2021-0103490

(51) Int. Cl.
*H04L 1/18* (2023.01)
*H04L 5/00* (2006.01)

(52) U.S. Cl.
CPC .......... *H04L 5/0055* (2013.01); *H04L 5/0048* (2013.01)

(58) Field of Classification Search
CPC ... H01L 5/0055; H01L 5/0048; H01L 1/1854; H01L 1/1864; H01L 1/1896; H01L 1/18; H01L 1/1861; H04W 72/12
See application file for complete search history.

(56) References Cited

U.S. PATENT DOCUMENTS

| | | | | |
|---|---|---|---|---|
| 2021/0014647 A1 | 1/2021 | Takeda et al. | | |
| 2023/0422275 A1* | 12/2023 | Kim | ...................... | H04L 5/0055 |
| 2024/0267161 A1* | 8/2024 | Xu | ........................ | H04L 1/1861 |

OTHER PUBLICATIONS

CATT, "Discussion on reliability improvement mechanism for RRC_Connected Ues in MBS," R1-2100355, 3GPP TSG RAN WG1 #104-e, e-Meeting, Jan. 25-Feb. 5, 2020, 12 pages.

(Continued)

*Primary Examiner* — Anez C Ebrahim
(74) *Attorney, Agent, or Firm* — Fish & Richardson P.C.

(57) ABSTRACT

Disclosed are a method and device for performing uplink transmission and reception in a wireless communication system. A method by which a terminal performs uplink transmission, according to one embodiment of the present disclosure, may comprise the steps of: receiving, from a base station, a first PDSCH including a group common TB scheduled by a first multicast DCI; receiving, from the base station, a second PDSCH including the group common TB scheduled by a first unicast DCI; configuring a first HARQ-ACK codebook using first HARQ-ACK information for the second PDSCH and at least one piece of second HARQ-ACK information corresponding to a second unicast DCI; and transmitting a PUCCH including the first HARQ-ACK codebook to the base station.

8 Claims, 11 Drawing Sheets

(56) References Cited

OTHER PUBLICATIONS

Extended European Search Report in European Appln. No. 22853517.5, mailed on Nov. 6, 2024, 7 pages.
Huawei, "Status Report to TSG," RP-211361, 3GPP TSG RAN meeting #92e, Electronic Meeting, Jun. 14-18, 2021, 24 pages.
Ericsson, "Mechanisms to support MBS group scheduling for RRC_Connected Ues," 3GPP TSG-RAN WG1 Meeting #105-e, R1-2105914, e-Meeting, May 10-27, 2021, 28 pages.
International Search Report and Written Opinion in Appln. No. PCT/KR2022/011616, mailed on Nov. 18, 2022, 6 pages (with English translation).
LG Electronics Inc., "Support of group scheduling for RRC_Connected Ues," 3GPP TSG RAN WG1 Meeting #104B-e, R1-2105437, Online, Apr. 12-20, 2021, 15 pages.
Oppo et al., "UL feedback for RRC-Connected UEs in MBS," 3GPP TSG RAN WG1 #105-e, R1-2104760, e-Meeting, May 10-27, 2021, 6 pages.
Qualcomm Incorporated, "Views on UE feedback for Multicast RRC_Connected UEs," 3GPP TSG RAN WG1 #105-e, R1-2104696, e-Meeting, May 10-27, 2021, 8 pages.

* cited by examiner

METHOD AND DEVICE FOR PERFORMING UPLINK TRANSMISSION AND RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/011616, filed on Aug. 5, 2022, which claims the benefit of Korean Application No. 10-2021-0103490, filed on Aug. 5, 2021. The disclosures of the prior applications are incorporated by reference in their entirety.

TECHNICAL FIELD

The present disclosure relates to a wireless communication system, and more particularly, to a method and apparatus for performing uplink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide an uplink transmission/reception method and apparatus in a wireless communication system.

Additionally, an additional technical problem of the present disclosure is to provide a method and device for multiplexing unicast/multicast HARQ-ACK information based on priority/cast type.

The technical problems to be achieved by the present disclosure are not limited to the above-described technical objects, and other technical problems which are not described herein will be clearly understood by those skilled in the pertinent art from the following description.

A method for a user equipment (UE) to perform uplink transmission in a wireless communication system may include: receiving, from the base station, a first physical downlink shared channel (PDSCH) including a group common transport block (TB) scheduled by first multicast downlink control information (DCI); receiving, from the base station, a second PDSCH including the group common TB scheduled by a first unicast DCI; constructing a first HARQ-ACK codebook using first HARQ (hybrid automatic repeat and request)-ACK (acknowledgement) information for the second PDSCH and at least one second HARQ-ACK information corresponding to the second unicast DCI; and transmitting, to the base station, a physical uplink control channel (PUCCH) including the first HARQ-ACK codebook.

As an another embodiment of the present disclosure, a method for a base station to perform uplink reception in a wireless communication system may include: transmitting, to a user equipment (UE), a first physical downlink shared channel (PDSCH) including a group common transport block (TB) scheduled by first multicast downlink control information (DCI); transmitting, to the UE, a second PDSCH including the group common TB scheduled by a first unicast DCI; receiving, from the UE, a physical uplink control channel (PUCCH) including the first HARQ-ACK codebook, and the first HARQ-ACK codebook is constructed based on first HARQ-ACK information for the second PDSCH and at least one second HARQ-ACK information corresponding to the second unicast DCI.

According to an embodiment of the present disclosure, an uplink transmission/reception method and apparatus may be provided in a wireless communication system.

Additionally, according to an embodiment of the present disclosure, a method and device for multiplexing unicast/multicast HARQ-ACK information based on priority/cast type may be provided.

Additionally, according to an embodiment of the present disclosure, ambiguity that may occur when one or more unicast/multicast HARQ-ACK information is transmitted in the same unit of time may be resolved.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

TDM in a wireless communication system to which the present disclosure may be applied.

Figure 10:
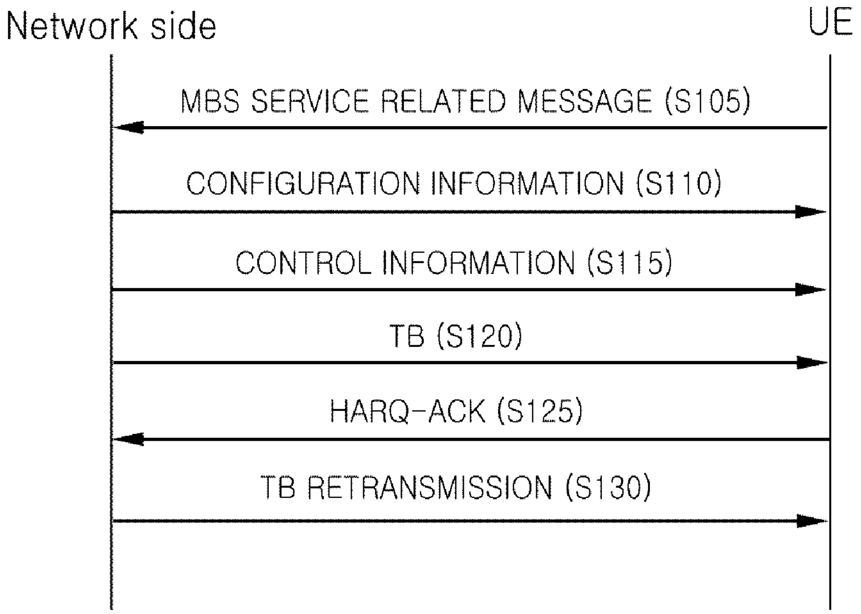

FIG. 10 is a diagram for describing the signaling procedure of the network side and the terminal according to an embodiment of the present disclosure.

Figure 11:
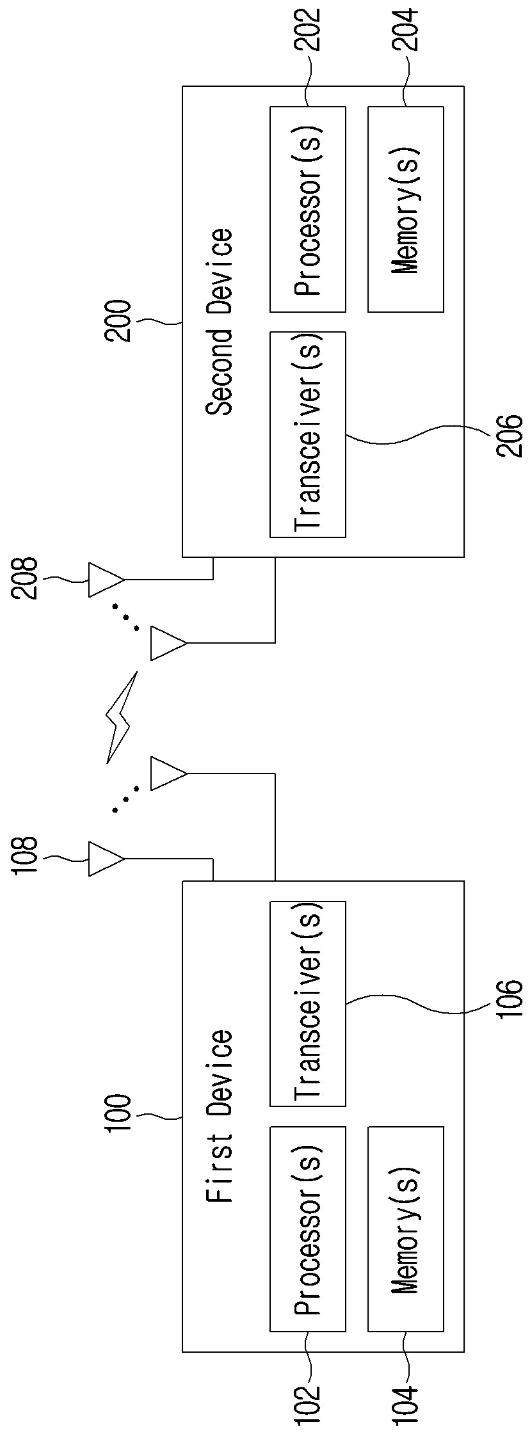

FIG. 11 illustrates a block diagram of a wireless communication device according to an embodiment of the present disclosure.

DETAILED DESCRIPTION

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

Figure 1:
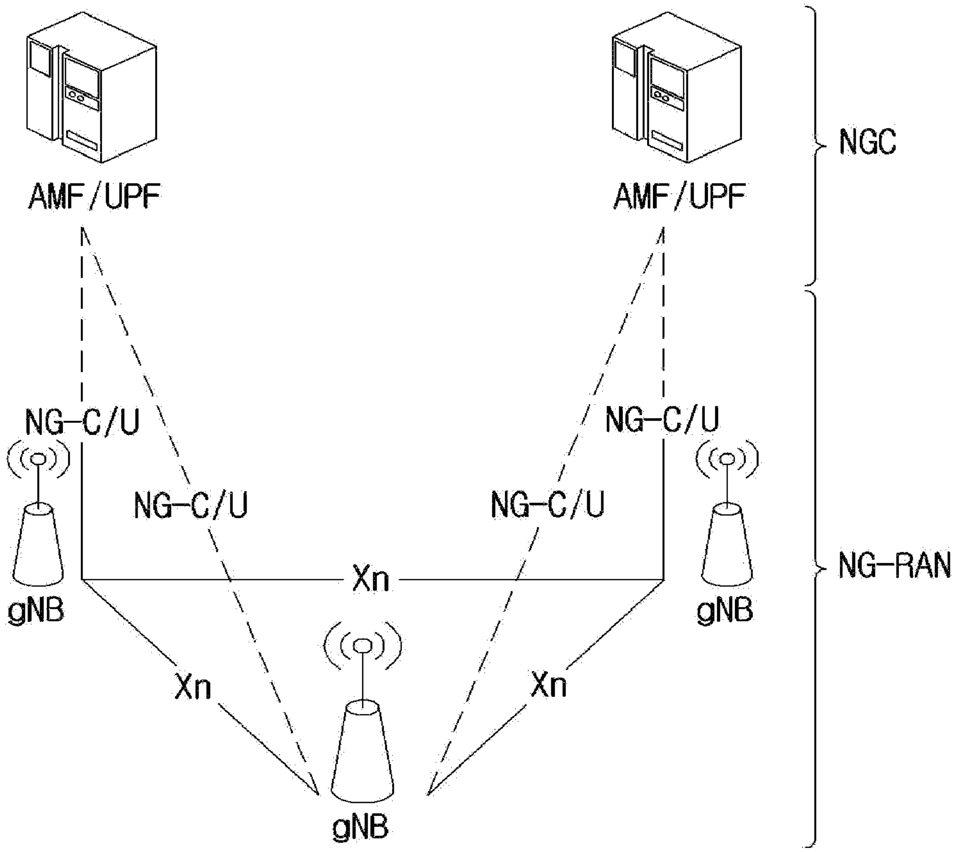
FIG. 1 illustrates a structure of a wireless communication system to which the present disclosure may be applied.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
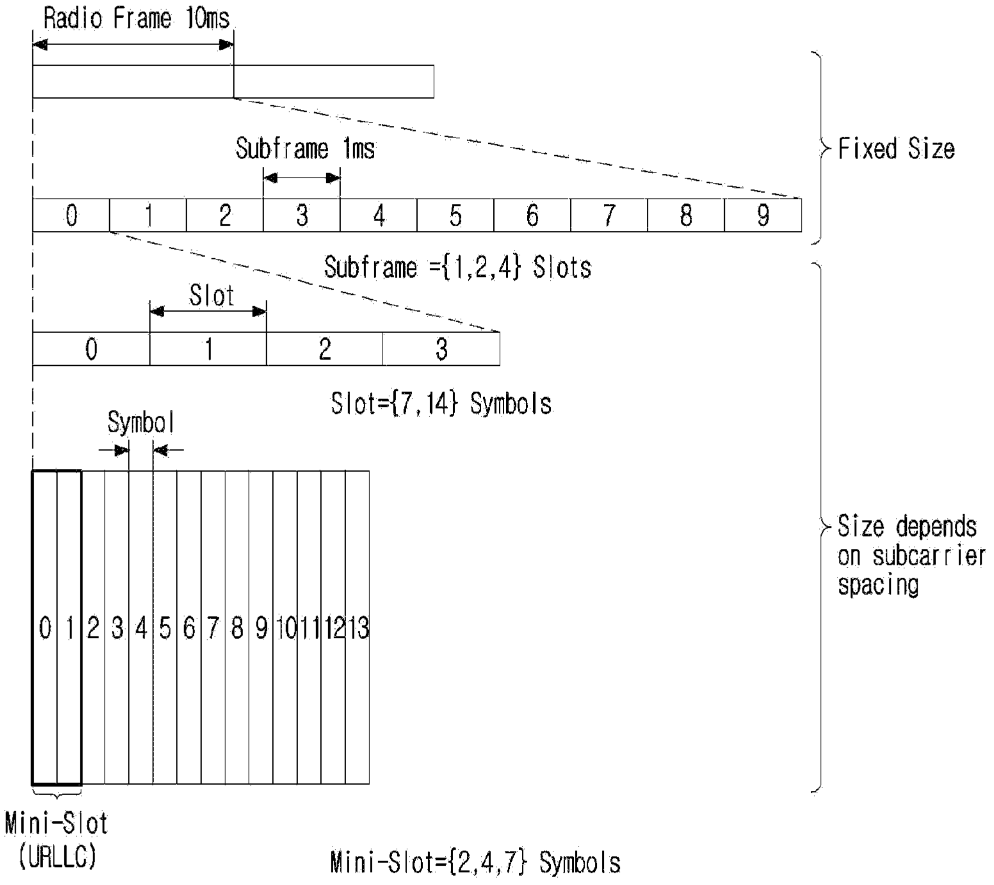
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot10^3$ Hz and $N_f$ is 4096. Downlink and uplink transmission is configured (organized) with a radio frame having a duration of $T_f=1/(\Delta f_{max}N_f/100)$. $T_c$=10 ms. Here, a radio frame is configured with 10 subframes having a duration of $T_{sf}=(\Delta f_{max}N_f/1000)$. $T_c$=1 ms, respectively. In this case, there may be one set of frames for an uplink and one set of frames for a downlink. In addition, transmission in an uplink frame No. i from a terminal should start earlier by $T_{TA}=(N_{TA}+N_{TA,offset})$ $T_c$ than a corresponding downlink frame in a corresponding terminal starts. For a subcarrier spacing configuration μ, slots are numbered in an increasing order of $n_s\mu\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{frame,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
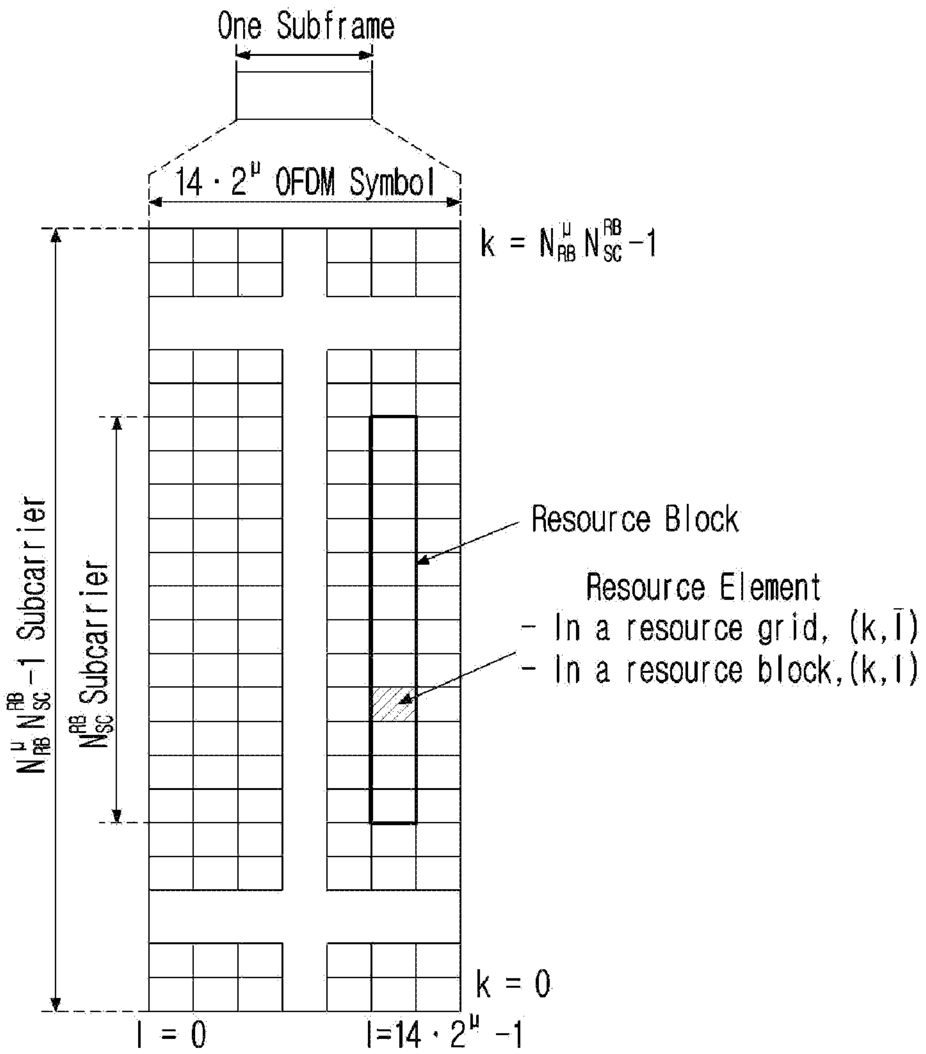
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $N_{RB}^{\mu}N_{sc}^{RB}$ subcarriers in a frequency domain and one subframe is configured with $14\cdot2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RE}^{max,\mu}$. The $N_{RB}^{max,\mu}$ represents a maximum transmission bandwidth, which may be different between an uplink and a downlink as well as between numerologies.

In this case, one resource grid may be configured per u and antenna port p. Each element of a resource grid for u and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $1\text{-}0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \qquad \text{[Equation 2]}$$

$N_{BWP,i}^{start,\mu}$ is a common resource block that a BWP starts relatively to common resource block 0.

Figure 4:
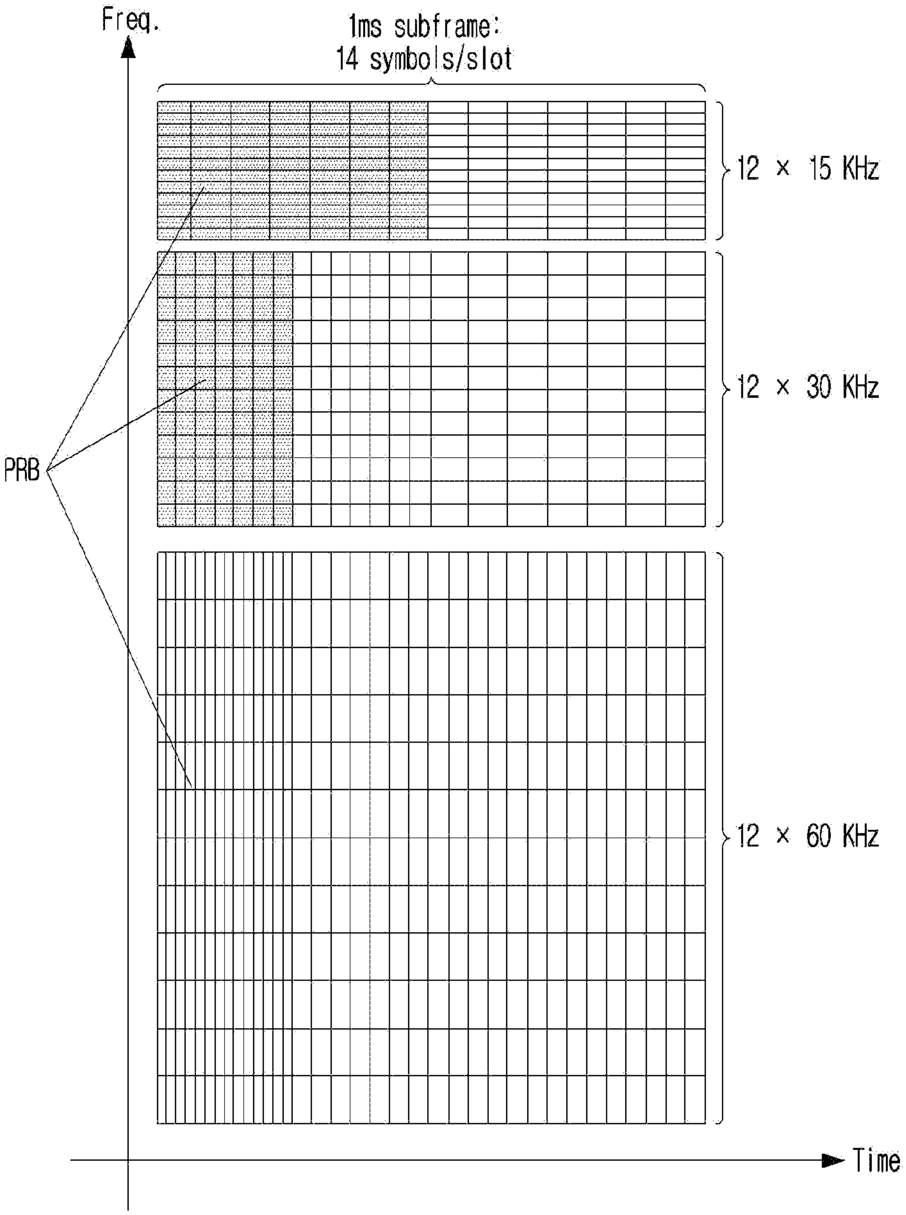
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
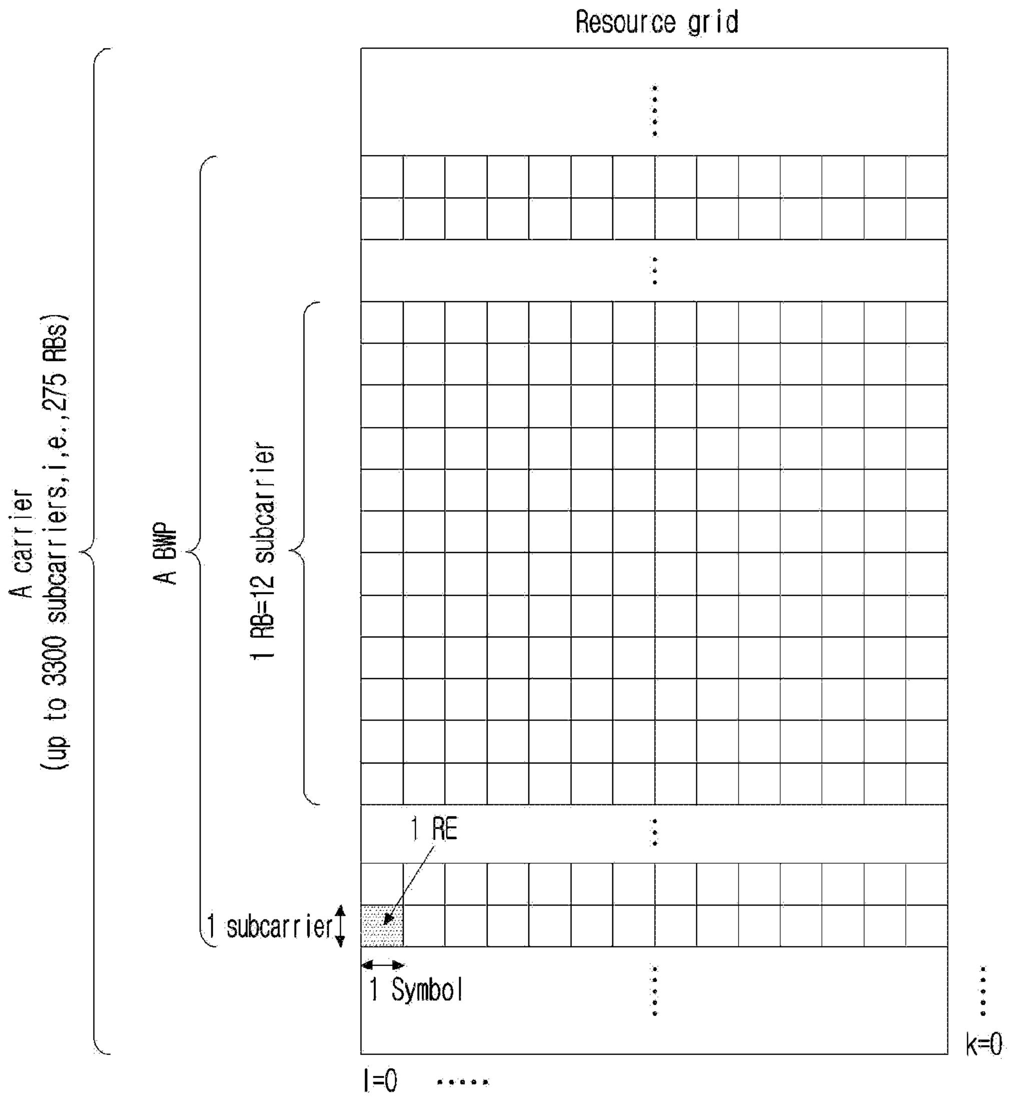
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.).

Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
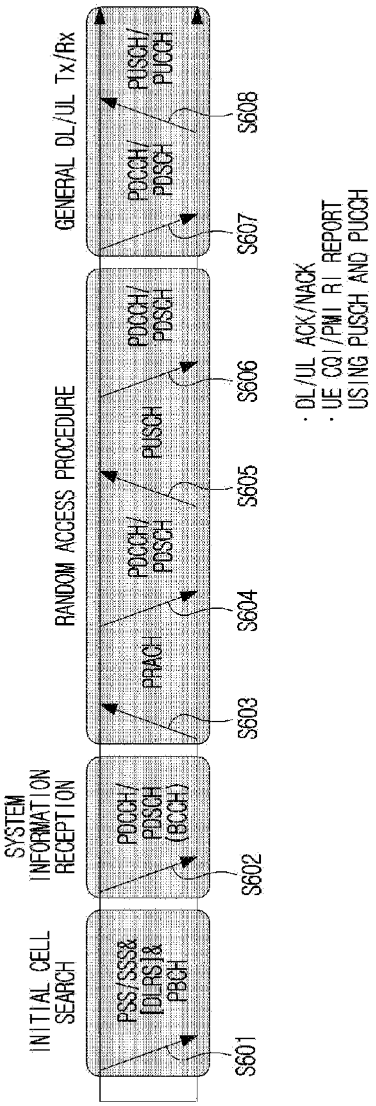
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted. Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined. DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast/Multicast Service) Scheme

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

Here, SFN scheme may be used to provide a broadcast service to a wide area (e.g., MBMS area) through resources allocated semi-statically in advance, and SC-PTM scheme may be mainly used to provide a broadcast service only within a cell coverage through dynamic resources.

SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting SC-MCCH or SC-MTCH data may be scheduled through a PDCCH indicated by a Group Radio Network Temporary Identifier (G-RNTI).

In this case, a temporary mobile group identify (TMGI) corresponding to the service ID may be mapped one-to-one with a specific G (group)-RNTI value. Accordingly, when the base station provides a plurality of services, a plurality of G-RNTI values may be allocated for SC-PTM transmission. One or a plurality of terminals may perform PDCCH monitoring by using a specific G-RNTI to receive a specific service.

And, for a specific service/specific G-RNTI, SC-PTM dedicated DRX on-duration section may be configured, and in this case, the UEs may wake up only for a specific on-duration period and perform PDCCH monitoring for the G-RNTI.

MBS (Multicast Broadcast Service) Based Transmission/Reception Operation

In a basic wireless communication system, the base station sets UE-specific SPS (semi-persistent scheduling) configuration information to a specific terminal, so that a downlink (DL) SPS transmission resource that is repeated according to a configured period may be allocated to a specific terminal. In this case, the DCI transmitted through the UE-dedicated PDCCH indicates activation of a specific SPS configuration index (SPS activation), thereby indicating the corresponding terminal to repeatedly receive the SPS transmission resource according to a configured period.

This initial SPS transmission resource may be used for initial HARQ transmission, and the base station may allocate a retransmission resource of a specific SPS configuration index through DCI transmitted through a UE-dedicated PDCCH. For example, when the terminal reports a HARQ negative acknowledgment (NACK) for the SPS transmission resource, the base station may allocate the retransmission resource to DCI so that the terminal may receive the DL retransmission.

And, the DCI transmitted through the UE-dedicated PDCCH may indicate deactivation (SPS release or SPS deactivation) of a specific SPS configuration index, and in this case, the corresponding UE may not receive the indicated SPS transmission resource. Here, the CRC of the DCI for the activation/retransmission/deactivation may be scrambled with a CS-RNTI (Configured Scheduling RNTI).

In a wireless communication system (e.g., NR), a DL broadcast or DL multicast transmission scheme for supporting an MBS similar to the above-described MBMS may be applied. The base station may provide a point-to-multipoint (PTM) transmission scheme and a point-to-point (PTP) transmission scheme for DL broadcast or DL multicast transmission.

In the PTM transmission scheme for MBS, the base station may transmit a group common PDCCH and a group common PDSCH to a plurality of terminals, and a plurality of UEs may simultaneously receive the same group common PDCCH and group common PDSCH transmission and decode the same MBS data.

In addition, in the PTP transmission scheme for MBS, the base station may transmit the UE-dedicated PDCCH and the UE-dedicated PDSCH to a specific UE, and only the corresponding UE may receive the UE-dedicated PDCCH and the UE-dedicated PDSCH. Here, when there are a plurality of UEs receiving the same MBS service, the base station may separately transmit the same MBS data to individual UEs through different UE-dedicated PDCCHs and UE-dedicated PDSCHs.

In the PTM transmission scheme, the base station may transmit a plurality of group common PDSCHs to UEs. At this time, the base station may receive the UE's HARQ-ACK for the group common PDSCH through the UE-dedicated PUCCH resource. At this time, if the TB (Transport Block) for the group common PDSCH is successfully decoded, the UE may transmit ACK with HARQ-ACK information.

If the TB for the unicast PDSCH is not successfully decoded, the UE may transmit NACK as HARQ-ACK information. This HARQ-ACK transmission scheme may be referred to as ACK/NACK-based HARQ-ACK. The UE may transmit ACK/NACK-based HARQ-ACK using UE-dedicated PUCCH resources.

Also, assume that a NACK-based (NACK only based) HARQ-ACK scheme is configured for the group common PDSCH. The UE may not perform PUCCH transmission in a situation where ACK must be transmitted. And, the UE may perform PUCCH transmission only in situations where NACK must be transmitted. Here, the UE may transmit HARQ-ACK information including NACK through PUCCH using group common PUCCH resources.

In a basic wireless communication system, a UE may receive unicast traffic through a UE-specific unicast PDSCH and receive multicast traffic such as MBS through a group common multicast PDSCH. At this time, the UE may transmit unicast HARQ-ACK for the unicast PDSCH and multicast HARQ-ACK for the multicast PDSCH.

At this time, it is assumed that PUCCH transmission for unicast HARQ-ACK and PUCCH transmission for multicast HARQ-ACK overlap (in the time/frequency domain) or are transmitted in the same slot. If the UE cannot transmit two PUCCHs simultaneously, there is a problem that the transmission method of unicast HARQ-ACK and multicast HARQ-ACK in the same time domain (e.g., in the same slot) is not clear.

The base station may set a priority (e.g., high priority (HP) or low priority (LP)) for each (individual) transmission of unicast PDSCH and multicast PDSCH using DCI for scheduling PDSCH. Hereinafter, the transmission method of unicast HARQ-ACK and multicast HARQ-ACK will be described considering cast type and/or priority.

Figure 7:
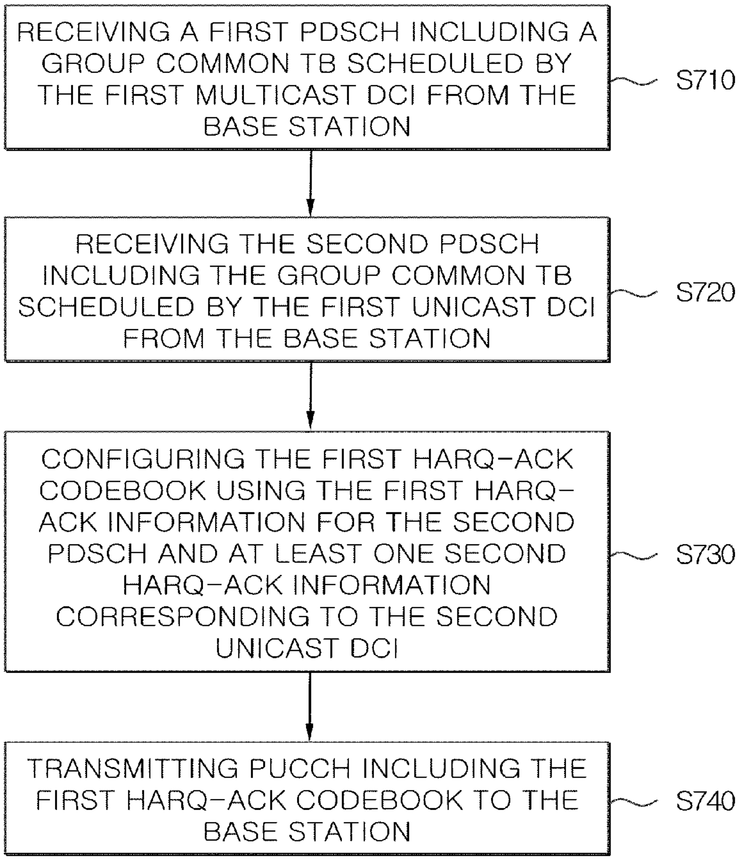
FIG. 7 is a diagram for describing the uplink transmission operation of a terminal in a wireless communication system to which the present disclosure may be applied.

FIG. 7 is a diagram for describing an uplink transmission operation of a UE in a wireless communication system to which the present disclosure may be applied.

The UE may receive a first physical downlink shared channel (PDSCH) including a group common transport block (TB) scheduled by the first multicast downlink control information (DCI) from the base station (S710).

That is, the UE may decode MBS data from the base station using the PTM scheme. Specifically, the UJE may receive the first multicast DCI from the base station. Here, the first multicast DCI (or first group common DCI) refers to the DCI transmitted through the first multicast PDCCH (or group common PDDCH). The first multicast DCI may be CRC scrambled with at least one of G-RNTI or G-CS-RNTI.

The UE may receive the first PDSCH (or group common PDSCH/multicast PDSCH) scheduled by the first multicast DCI from the base station. At this time, the first PDSCH is a group common PDSCH/multicast PDSCH and may include a group common TB.

The UE may receive the second PDSCH including the group common TB scheduled by the first unicast DCI from the base station (S720).

The UE may receive the PTP retransmission of the (group common) TB transmitted to the PTM of the base station. The PTP transmission scheme refers to a method in which the base station transmits a UE-only PDCCH/PDSCH to the UE. That is, the group common TB scheduled by the first unicast DCI may be the same as the group common TB scheduled by the first multicast DCI.

The UE may configure the first HARQ (hybrid automatic repeat and request)-ACK (acknowledgement) codebook using the first HARQ-ACK information for the second PDSCH and at least one second HARQ-ACK information corresponding to the second unicast DCI (S730).

The UE may classify/regard the first HARQ-ACK information for PTP retransmission for group TB as unicast HARQ-ACK information. Here, unicast HARQ-ACK information may mean HARQ-ACK information for a unicast PDSCH (or UE-dedicated/specific PDSCH) scheduled by a unicast PDCCH (or UE-dedicated/specific PDCCH).

And, at least one second HARQ-ACK information corresponding to the second unicast DCI means HARQ-ACK information for the unicast PDSCH scheduled by the second unicast DCI.

For example, the priorities of the first HARQ-ACK information and the second HARQ-ACK information may be the same. For example, priority indices associated with each of the first HARQ-ACK information and the second HARQ-ACK information may be the same.

The UE may configure/determine the first HARQ-ACK codebook (e.g., type-2 codebook) by concatenating the first HARQ-ACK information and the second HARQ-ACK information.

The UE may transmit PUCCH including the first HARQ-ACK codebook to the base station (S740). That is, the UE may transmit the first HARQ-ACK information and the second HARQ-ACK information through one PUCCH.

As another example, a second HARQ-ACK codebook that is different from the first HARQ-ACK codebook may be configured based on the third HARQ-ACK information for the first PDSCH. That is, the third HARQ-ACK information (i.e., multicast HARQ-ACK information) for the first PDSCH scheduled by the first multicast DCI may be composed of a codebook different from the first HARQ-ACK information.

For example, the second HARQ-ACK codebook may include third HARQ-ACK information and fourth HARQ-ACK information (i.e., HARQ-ACK information for PDSCH scheduled by the second multicast DCI) corresponding to the second multicast DCI. That is, the second HARQ-ACK codebook may include third HARQ-ACK information and other multicast HARQ-ACK information.

And, each of the third HARQ-ACK information and fourth HARQ-ACK information may correspond to an individual G (group)-RNTI (Radio Network Temporary Identifier) value. For example, the second HARQ-ACK codebook may be configured based on the G-RNTI value (e.g., based on ascending order of G-RNTI values) corresponding to each of the third HARQ-ACK information and the fourth HARQ-ACK information.

And, the priorities of the third HARQ-ACK information and the priorities of the fourth HARQ-ACK information may be the same. For example, priority indices associated with each of the third HARQ-ACK information and fourth HARQ-ACK information may be the same.

As another example, the first and/or third HARQ-ACK information may include only a negative acknowledgment (NACK) value or may include at least one of an ACK value and a NACK value.

Figure 8:
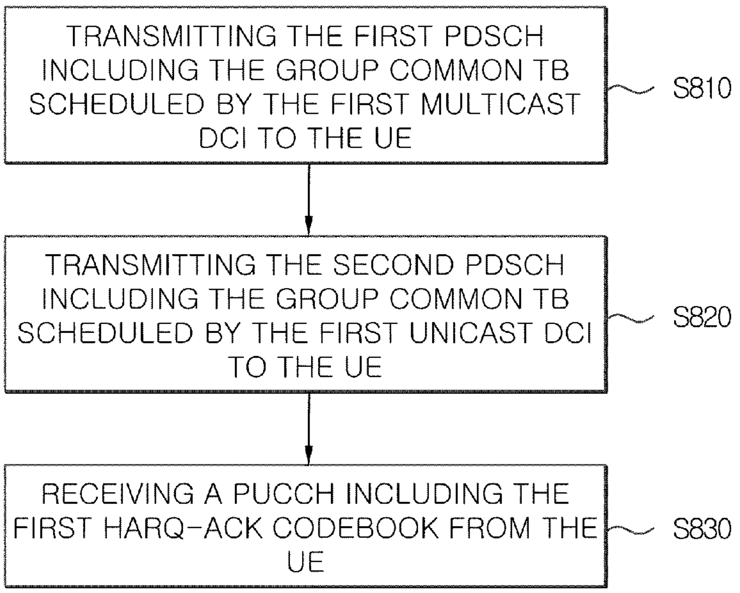
FIG. 8 is a diagram for describing the uplink reception operation of a base station in a wireless communication system to which the present disclosure may be applied.

FIG. 8 is a diagram for describing an uplink reception operation of a base station in a wireless communication system to which the present disclosure may be applied.

The base station may transmit the first PDSCH including the group common TB scheduled by the first multicast DCI to the UE (S810).

The base station may transmit the second PDSCH including the group common TB scheduled by the first unicast DCI to the UE (S820).

The base station may receive a PUCCH including the first HARQ-ACK codebook from the UE (S830).

Here, the first HARQ-ACK codebook may be configured based on the first HARQ-ACK information for the second PDSCH and at least one second HARQ-ACK information corresponding to the second unicast DCI.

Since operations and features related to S810, S820, and S830 correspond to S710, S720, and S730, overlapping descriptions will be omitted.

Hereinafter, 1) when ACK/NACK-based multicast HARQ-ACK transmission and unicast HARQ-ACK transmission overlap or must be transmitted in the same slot, or 2) when ACK/NACK-based multicast HARQ-ACK transmissions for different multicast PDSCH transmissions overlap or must be transmitted in the same slot, a detailed description will be given of how to transmit multiple HARQ-ACKs by multiplexing them into one PUCCH or dividing them into multiple PUCCHs.

Figure 9:
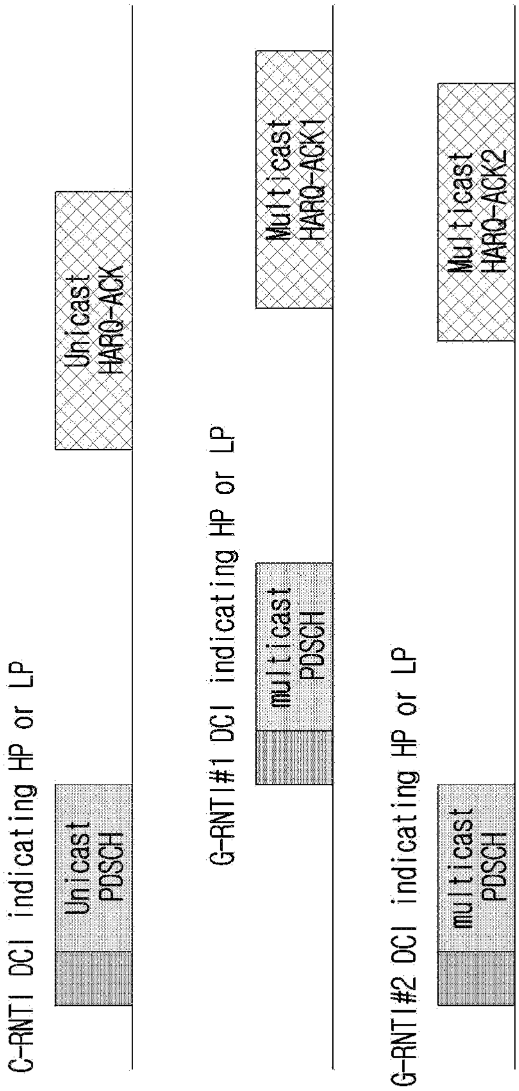
FIG. 9 is a diagram illustrating a process for receiving a unicast/multicast downlink channel transmitted in FDM/

As shown in FIG. 9, the UE may receive both unicast PDCCH/PDSCH and multicast PDCCH/PDSCH transmitted in FDM or TDM from the base station.

At this time, the UE may transmit both unicast HARQ-ACK and multicast HARQ-ACK for unicast PDCCH/PDSCH and multicast PDCCH/PDSCH to the base station. However, depending on the capabilities of the UE, the UE may transmit only one PUCCH (per unit time) or may transmit multiple PUCCHs.

In the present disclosure, the UE may transmit the PUCCH in a designated situation according to the configurations of the base station, considering its PUCCH transmission capability. For example, the UE may transmit unicast PDCCH/PDSCH and multicast PDCCH/PDSCH through one PUCCH, or through multiple PUCCHs in the same slot, using an embodiment that will be described later. Multiple PUCCHs in the same slot may be transmitted using TDM or FDM depending on the capabilities of the UE.

Embodiment 1

Assume that NACK-only-based multicast HARQ-ACK transmission and ACK/NACK-based unicast HARQ-ACK transmission overlap (in the time/frequency domain) or must be performed in the same slot, or NACK-only-based multicast HARQ-ACK transmission and ACK/NACK-based multicast HARQ-ACK transmission overlap or must be performed in the same slot. Embodiment 1 relates to a priority based HARQ-ACK codebook configuration method in the case described above.

As an example, the UE may configure one codebook or one sub-codebook by joint coding multicast HARQ-ACK and unicast HARQ-ACK with the same priority.

Additionally or alternatively, the UE may configure one codebook or one sub-codebook by separately coding multicast HARQ-ACK and unicast HARQ-ACK with different priorities.

Additionally or alternatively, the UE may encode multicast HARQ-ACKs with the same priority into one codebook or one sub-codebook. At this time, the two multicast HARQ-ACKs correspond to different HARQ-ACKs for each of the PDSCHs scheduled to different G-RNTIs. And, G (group)-RNTI means the identifier of the terminal group receiving MBS.

Additionally or alternatively, the UE may configure multicast HARQ-ACKs with different priorities into one codebook or one sub-codebook using an individual coding method. At this time, the two multicast HARQ-ACKs correspond to different HARQ-ACKs for each of the PDSCHs scheduled to different G-RNTIs.

Additionally or alternatively, it is assumed that at least two types of transmission among multicast HARQ-ACK transmission as LP, unicast HARQ-ACK transmission as LP, multicast HARQ-ACK transmission as HP, or unicast HARQ-ACK transmission as HP overlap or are performed in the same slot.

For example, if LP multicast HARQ-ACK and LP unicast HARQ-ACK overlap or are transmitted in the same slot, the UE may jointly code the corresponding HARQ-ACKs to configure one LP sub-codebook. Additionally or alternatively, if the HP multicast HARQ-ACK and the HP unicast HARQ-ACK overlap or are transmitted in the same slot, the UE may jointly code the corresponding HARQ-ACKs to form one sub-codebook for HP.

At this time, the UE may configure the sub-codebook in the order of {unicast HARQ-ACK, multicast HARQ-ACK} at the same priority level. That is, when configuring a sub-codebook for LP/HP, the UE may configure the multicast HARQ-ACK to follow the unicast HARQ-ACK in the same sub-codebook for priority.

As another example, the UE may configure the sub-codebook in the order of {multicast HARQ-ACK, unicast HARQ-ACK} at the same priority level. That is, when configuring a sub-codebook for LP/HP, UE may configure the multicast HARQ-ACK to follow the unicast HARQ-ACK in the same sub-codebook for priority.

Additionally, the UE may configure/construct one HARQ-ACK codebook by separately coding the sub-codebook for LP and the sub-codebook for HP, and transmit the configured/constructed HARQ-ACK codebook through PUCCH (Embodiment 1A).

Here, when the UE configures the HARQ-ACK codebook, it may be configured in the order of {sub-codebook for LP, sub-codebook for HP}, or {sub-codebook for HP, sub-codebook for LP}. And, the UE may transmit one HARQ-ACK codebook through one PUCCH.

Additionally or alternatively, the UE may transmit the sub-codebook for LP and the sub-codebook for HP through two different PUCCHs in the same slot (Embodiment 1B).

Specifically, the UE may multiplex two PUCCHs in the same slot using TDM. For example, the sub-codebook for HP may be transmitted as the HARQ-ACK codebook of PUCCH with the earliest starting symbol or ending symbol. The sub-codebook for LP may be transmitted as the HARQ-ACK codebook of PUCCH with the latest start symbol or ending symbol.

As another example, the sub-codebook for HP may be transmitted as a HARQ-ACK codebook of PUCCH resources for HP, and the sub-codebook for LP may be transmitted as a HARQ-ACK codebook of PUCCH resources for LP.

Embodiment 2

Assume that ACK/NACK-based multicast HARQ-ACK transmission and unicast HARQ-ACK transmission overlap or are performed in the same slot. Embodiment 2 relates to a method of configuring a HARQ-ACK codebook based on cast type.

The UE may jointly code LP multicast HARQ-ACK and HP multicast HARQ-ACK having the same cast type. In addition, the UE may separately code multicast HARQ-ACK and unicast HARQ-ACK transmission with different cast types.

Additionally or alternatively, it is assumed that at least two types of transmission among multicast HARQ-ACK as LP, unicast HARQ-ACK as LP, multicast HARQ-ACK as HP, or unicast HARQ-ACK as HP transmission overlap or are performed in the same slot.

For example, if the LP multicast HARQ-ACK and the HP multicast HARQ-ACK overlap or are transmitted in the same slot, the UE may jointly code each HARQ-ACK to form one multicast sub-codebook. Additionally or alternatively, if LP unicast HARQ-ACK and HP unicast HARQ-ACK overlap or are transmitted in the same slot, the UE may jointly code each HARQ-ACK to construct one unicast sub-codebook.

At this time, the UE may configure the sub-codebook in the order of {HP HARQ-ACK, LP HARQ-ACK} in the same cast type. That is, when configuring a sub-codebook for unicast/multicast, the UE may configure LP HARQ-ACK to follow HP HARQ-ACK in the sub-codebook for each cast type.

As another example, the UE may configure a sub-codebook in the order of {LP HARQ-ACK, HP HARQ-ACK} in the same cast type. That is, when configuring a sub-codebook for unicast/multicast, the UE may configure HP HARQ-ACK to follow LP HARQ-ACK in the sub-codebook for each cast type.

As an example, the UE may construct/configure one HARQ-ACK codebook by separately coding the sub-codebook for multicast and the sub-codebook for unicast, and transmit the constructed/configured HARQ-ACK codebook through PUCCH (Embodiment 2A).

Here, the UE may configure the HARQ-ACK codebook in the order of {Sub-codebook for unicast, sub-codebook for multicast}, or can configure the HARQ-ACK codebook in the order {sub-codebook for multicast, sub-codebook for unicast}. The UE may transmit one HARQ-ACK codebook with one PUCCH.

Additionally or alternatively, the UE may transmit the sub-codebook for multicast and the sub-codebook for unicast on two different PUCCHs (Embodiment 2B).

For example, the sub-codebook including HARQ-ACK for HP may be transmitted as the HARQ-ACK codebook of the PUCCH resource for HP, and a sub-codebook that does not include HARQ-ACK, which is HP, may be transmitted as the HARQ-ACK codebook of the PUCCH resource for LP.

Assume the case where both the sub-codebook for multicast and the sub-codebook for unicast include HARQ-ACK with HP. Here, the sub-codebook for unicast may be transmitted as the HARQ-ACK codebook of PUCCH with the earliest starting symbol or ending symbol, and the sub-codebook for multicast may be transmitted as the HARQ-ACK codebook of PUCCH with the latest start symbol or ending symbol.

Additionally or alternatively, the UE may transmit multicast HARQ-ACK as LP, unicast HARQ-ACK as LP, multicast HARQ-ACK as HP, and unicast HARQ-ACK as HP to be transmitted in overlapping or same slots. on four different PUCCHs (Method 2C).

For example, if three different HARQ-ACKs among Multicast HARQ-ACK as LP, Unicast HARQ-ACK as LP, Multicast HARQ-ACK as HP, and Unicast HARQ-ACK as HP overlap or are transmitted in the same slot, the UE may transmit the corresponding HARQ-ACK on three different PUCCHs.

Embodiment 3

Assume that ACK/NACK-based multicast HARQ-ACK transmission and unicast HARQ-ACK transmission for PTM transmission and PTP retransmission overlap or are performed in the same slot. Embodiment 3 relates to a method of configuring a priority-based HARQ-ACK codebook in the case described above.

Assume that both the PUCCH resource for HP and the PUCCH resource for LP for the unicast PDSCH are configured for the UE.

As an example, the UE may configure the HARQ-ACK codebook by individually coding multicast HARQ-ACK for HP PTM PDSCH and unicast HARQ-ACK for LP unicast PDSCH transmitted in overlapping or same slot (in time/frequency domain).

As an example, the UE may construct the HARQ-ACK codebook by jointly coding multicast HARQ-ACK for PTM PDSCH, LP overlapping (in time/frequency domain) or transmitted in the same slot and unicast HARQ-ACK for LP unicast PDSCH.

As an example, the UE may construct the HARQ-ACK codebook by separately coding multicast HARQ-ACK for HP PTP PDSCH retransmissions (i.e., retransmission in PTP scheme for TB transmitted in PTM scheme) overlapping or transmitted in the same slot (in the time/frequency domain) and unicast HARQ-ACK for LP unicast PDSCH.

As an example, the UE may construct the HARQ-ACK codebook by jointly coding multi-task HARQ-ACK for PTP PDSCH retransmissions (i.e., retransmission in PTP scheme for TB transmitted in PTM scheme), LPs transmitted in overlapping or same slots (in time/frequency domain) and unicast HARQ-ACK for LP unicast PDSCH.

Assume that only the PUCCH resource for LP for the unicast PDSCH is configured for the UE, and the PUCCH resource for HP is not configured.

As an example, when a PUCCH resource for HP is configured for a multicast PDSCH for a UE, the UE may determine that all PUCCH resource configurations for HP, all PUCCH resource settings for multicast, or all PUCCH resource configurations are invalid, and invalidate the corresponding PUCCH configuration(s) (Embodiment 3-1). Therefore, the UE may not expect that only the PUCCH resource for HP is configured for multicast without configuring the PUCCH resource for HP for unicast.

As another example, when PTP retransmission is configured to be supported for the UE or when PTP retransmission is configured to be supported for HP, PUCCH resources for HP for unicast may also be configured for the corresponding UE (Embodiment 3-2). Therefore, when PTP retransmission is configured without PUCCH resource configuration for HP for unicast or when PTP retransmission for HP is configured, the UE may invalidate the configuration for the corresponding PTP retransmission. And, the UE may not perform PTP retransmission.

As an example, if the PUCCH resource for HP and the PUCCH resource for LP are configured for the multicast PDSCH for the UE, and only the PUCCH resource for LP is configured for the unicast PDSCH, for the UE, PTP retransmission for multicast may not be configured or may not be scheduled (Embodiment 3-3).

Therefore, in the PUCCH configuration, when receiving the PTP retransmission configuration for multicast, the UE determines that the PTP retransmission configuration is invalid. Alternatively, if PTP retransmission for multicast is scheduled by DCI, the UE may not receive the PTP retransmission, or may not transmit a HARQ-ACK for the PTP retransmission even if it receives it. That is, the UE may drop the corresponding HARQ-ACK.

As an example, if the PUCCH resource for HP and the PUCCH resource for LP are configured for the multicast PDSCH for the UE, and only the PUCCH resource for LP is configured for the unicast PDSCH, the UE may determine that PTP retransmission for multicast is always LP (Embodiment 3-4). For example, regardless of the priority of the PTM (initial) transmission (e.g., even if the priority of the corresponding PTM transmission is HP), the UE may regard/configure the PTP retransmission of the TB transmitted as PTM to always be LP.

Therefore, even if there is no PUCCH resource configuration for HP for unicast PDSCH, Multicast HARQ-ACK for PTP retransmission and unicast HARQ-ACK for unicast PDSCH may be jointly coded to be the same LP and multiplexed into one HARQ-ACK codebook.

As another example, assume that the PUCCH resource for HP and the PUCCH resource for LP are configured for the multicast PDSCH, and only the PUCCH resource for LP is configured for the unicast PDSCH. At this time, when HARQ-ACK for PTP retransmission for multicast and HARQ-ACK for unicast are multiplexed, HARQ-ACK for PTP retransmission for HP multicast can be (temporarily) switched to LP (Embodiment 3-5).

For example, even if the priority of PTM (first) transmission was HP, if the multicast HARQ-ACK and unicast HARQ-ACK for PTP retransmission of the TB transmitted through PTM overlap or are performed in the same slot, the UE may temporarily change the priority of PTP retransmission from HP to LP. In addition, the UE may jointly code the LP unicast HARQ-ACK and the LP multicast HARQ-ACK for PTP retransmission and multiplex them with the same HARQ-ACK codebook. That is, the priority of PTP retransmission may be temporarily converted to LP only for HARQ-ACK codebook configuration.

As another example, assume that the PUCCH resource for HP and the PUCCH resource for LP are configured for the multicast PDSCH, and only the PUCCH resource for LP is configured for the unicast PDSCH. If HARQ-ACK for PTP retransmission for multicast and HARQ-ACK for unicast overlap or are transmitted in the same slot, PTP retransmission for LP multicast may be multiplexed with LP unicast HARQ-ACK and one HARQ-ACK codebook (Embodiment 3-6). And, the UE may transmit the HARQ-ACK codebook as one PUCCH according to the PUCCH resources for LP for unicast.

And, PTP retransmission for HP multicast may be transmitted as one PUCCH according to the PUCCH resource configurations for HP for multicast, and unicast HARQ-ACK, which is LP, may be transmitted on a separate PUCCH according to the PUCCH resource configurations for LP for unicast. Therefore, two PUCCHs may be transmitted in one slot.

In Embodiment 3, when multiplexing multicast HARQ-ACK for PTP retransmission and unicast HARQ-ACK for unicast PDSCH, a HARQ-ACK codebook may be configured and transmitted as one of the embodiments to be described later.

As an example, a HARQ-ACK codebook may be constructed by jointly coding unicast HARQ-ACK with the same priority and multicast HARQ-ACK for PTP retransmission (Embodiment 3-A).

Here, the HARQ-ACK codebook may be configured so that the unicast HARQ-ACK bit precedes the multicast HARQ-ACK bit for PTP retransmission. And, the UE may transmit the corresponding HARQ-ACK codebook to the base station as one PUCCH.

As an example, unicast HARQ-ACK and multicast HARQ-ACK for PTP retransmission are composed of separate sub-codebooks, and one HARQ-ACK codebook may be constructed by individually coding each sub-codebook (Embodiment 3-B). And, the UE may transmit the corresponding HARQ-ACK codebook through one PUCCH.

Here, the HARQ-ACK codebook may be configured so that unicast HARQ-ACK precedes multicast HARQ-ACK for PTP retransmission. Alternatively, the HARQ-ACK codebook may be configured so that HARQ-ACK in HP has priority over HARQ-ACK in LP, or the HARQ-ACK codebook can be configured so that HARQ-ACK in LP has priority over HARQ-ACK in HP.

As an example, the UE may configure unicast HARQ-ACK and multicast HARQ-ACK for PTP retransmission into separate codebooks, and transmit different codebooks to different PUCCHs in the same slot (Embodiment 3-C).

Here, the unicast HARQ-ACK codebook may be transmitted as the HARQ-ACK codebook of PUCCH with the earliest starting symbol or ending symbol. And, the multicast HARQ-ACK codebook may be transmitted as the HARQ-ACK codebook of PUCCH with the latest start symbol or ending symbol.

As an example, Multicast HARQ-ACK for PTP retransmission may be classified as unicast HARQ-ACK, and the UE may configure the HARQ-ACK codebook using unicast HARQ-ACK with the same priority and multicast HARQ-ACK for PTP retransmission using unicast HARQ-ACK coding (Embodiment 3-D). Accordingly, the UE may transmit the corresponding HARQ-ACK codebook through one PUCCH.

Specifically, the UE may construct one HARQ-ACK codebook by concatenating HARQ-ACK for PTP retransmission classified as unicast HARQ-ACK and unicast HARQ-ACK with the same priority. And, the UE may transmit a PUCCH including the corresponding HARQ-ACK codebook to the base station.

Embodiment 4

Assume that ACK/NACK-based multicast HARQ-ACK transmission and unicast HARQ-ACK transmission overlap (in the time/frequency domain) or are performed in the same slot. Embodiment 4 relates to a method of transmitting HARQ-ACK for multicast and unicast HARQ-ACK according to PUCCH configuration for multicast and PUCCH configuration for unicast.

As an example, when only the PUCCH resource for LP is set for unicast and only the PUCCH resource for HP is set for multicast, the UE may determine that the configured PUCCH resource is invalid, or may configure the HARQ-ACK codebook according to Embodiment 1 or Embodiment 2. And, the UE may transmit the corresponding HARQ-ACK codebook through PUCCH.

Additionally or alternatively, when both the PUCCH resource for LP and the PUCCH resource for HP for unicast are configured, and only the PUCCH resource for HP is configured for multicast, the UE may determine that the configured PUCCH resource is invalid, or may configure the HARQ-ACK codebook according to Embodiment 1 or Embodiment 2. And, the UE may transmit the corresponding HARQ-ACK codebook through PUCCH.

Additionally or alternatively, if only the PUCCH resource for LP is configured for unicast and only the PUCCH resource for LP is configured for multicast, or if both the PUCCH resource for LP and the PUCCH resource for HP are configured, the UE may construct the HARQ-ACK codebook according to Embodiment 1 or Embodiment 2. And, the UE may transmit the corresponding HARQ-ACK codebook through PUCCH.

Additionally or alternatively, when both the PUCCH resource for LP and the PUCCH resource for HP are configured for unicast, and only the PUCCH resource for LP is configured for multicast, or when both the PUCCH resource for LP and the PUCCH resource for HP are configured, the UE may configure the HARQ-ACK codebook according to Embodiment 1 or Embodiment 2. And, the UE may transmit the corresponding HARQ-ACK codebook through PUCCH.

Table 6 below shows options that can be selected when the UE multiplexes ACK/NACK-based multicast HARQ-ACK and unicast HARQ-ACK and transmits the PUCCH, based on unicast-specific and/or multicast-specific PUCCH configurations.

TABLE 6

| | Unicast configuration for HP only | Unicast configuration for LP only | Unicast configurations for both HP and LP |
|---|---|---|---|
| Multicast configuration for HP only | Invalid configuration | One of the following options may be selected: Invalid configuration Separate encoding for unicast and multicast Different TDMed PUCCH for unicast and multicast | One of the following options may be selected: Invalid configurations Joint encoding for unicast and multicast HP Separate encoding for LP and HP Different TDMed PUCCH for LP and HP |
| Multicast configuration for LP only | Invalid configuration | One of the valid setup options may be selected: Joint coding for unicast/ multicast LP Separate encoding for unicast and multicast Different TDMed PUCCH for unicast and multicast | Valid configurations One of the following options may be selected: Joint encoding for unicast/multicast LP Separate encoding for LP and HP Different TDMed PUCCH for LP and HP Separate encoding for unicast HP/LP and multicast LP Two different TDMed PUCCHs for unicast HP/ LP and multicast LP 3 different TDMed PUCCHs for unicast HP/LP and multicast LP |
| Multicast configurations for both HP and LP | Invalid configuration | One of the valid setup options may be selected: Joint coding for unicast/ multicast LP or HP Separate encoding for LP and HP Different TDMed PUCCH for LP and HP Separate encoding for unicast LP and multicast HP/LP Two different TDMed PUCCHs for unicast LP and multicast HP/LP | Valid configurations One of the following options may be selected: Joint encoding for unicast/ multicast LP or HP Separate encoding for LP and HP Different TDMed PUCCH for LP and HP Separate encoding for unicast HP/LP and multicast HP/LP Two different TDMed |

TABLE 6-continued

| Unicast configuration for HP only | Unicast configuration for LP only | Unicast configurations for both HP and LP |
|---|---|---|
| | 3 different TDMed PUCCHs for unicast LP and multicast HP/LP | PUCCHs for unicast HP/LP and multicast LP<br>3 different TDMed PUCCHs for unicast HP/LP and multicast LP |

Embodiment 5

Embodiment 5 relates to various transmission methods of HARQ-ACK. The UE may transmit HARQ-ACK using the method described later alone, or may transmit HARQ-ACK by combining the method described later and the above-described embodiments.

For example, if the entire unicast HARQ-ACK and multicast HARQ-ACK overlap (in the time/frequency domain), the UE may drop the LP HARQ-ACK and transmit the HP HARQ-ACK.

As another example, when the entire unicast HARQ-ACK and multicast HARQ-ACK overlap (in the time/frequency domain), the UE may select at least one of the options described later.

For example, the UE may preferentially transmit unicast HARQ-ACK and drop multicast HARQ-ACK (option 1).

As another example, the UE may decide which to transmit and drop first among unicast HARQ-ACK and multicast HARQ-ACK (option 2). And, the UE may transmit/drop HARQ-ACK in a determined order.

As another example, the UE may compare the priority indicated by the last received DCI for unicast HARQ-ACK and the priority indicated by the last received DCI for multicast HARQ-ACK, and transmit the HARQ-ACK with the highest priority as a result of comparison and drop the remaining HARQ-ACKs (option 3).

As another example, the UE may drop the HARQ-ACK with a smaller HARQ-ACK payload among unicast HARQ-ACK and multicast HARQ-ACK and transmit the remaining HARQ-ACK (i.e., the one with a larger HARQ-ACK payload) (Option 4).

In Table 7 below, when multicast HARQ-ACK of HP and/or LP and unicast HARQ-ACK of HP and/or LP or other multicast HARQ-ACK overlap, Options for transmitting HARQ-ACKs on one or two PUCCHs are described.

TABLE 7

| ACK/NACK based multicast | Unicast HP or Multicast HP | Unicast LP or Multicast LP | Unicast HP and LP |
|---|---|---|---|
| Multicast HP | Option 1:<br>One PUCCH TX<br>Joint coding for unicast and multicast<br>Joint coding for two multicasts<br>Separate encoding for unicast and multicast<br>Option 2:<br>Two PUCCH<br>Different TDMed PUCCHs for unicast and multicast | Option 1:<br>ONE PUCCH TX<br>Joint coding for unicast and multicast<br>Joint coding for both multicasts<br>Separate encoding for unicast and multicast<br>Separate encoding for LP and HP in multicast<br>Option 2:<br>Two PUCCH<br>Different TDMed PUCCH for unicast and multicast<br>Different TDMed PUCCH for LP and HP | Option 1:<br>ONE PUCCH TX<br>Joint coding for unicast and multicast<br>Separate encoding for unicast and multicast<br>Separate encoding for LP and HP<br>Separate encoding for unicast-LP, unicast-HP, and multicast-HP<br>Option 2:<br>Two PUCCHs<br>Different TDMed PUCCH for unicast and multicast<br>Different TDMed PUCCH for LP and HP |
| Multicast LP | Option 1:<br>One PUCCH TX<br>Joint coding for unicast and multicast<br>Joint coding for both multicasts<br>Separate encoding for unicast and multicast<br>Separate encoding for LP and HP in multicast<br>Option 2:<br>TWO PUCCH<br>Different TDMed PUCCH for unicast and multicast<br>Different TDMed PUCCHs for LP and HP | Option 1:<br>One PUCCH TX<br>Joint coding for unicast and multicast<br>Joint coding for both multicasts<br>Separate encoding for unicast and multicast<br>Option 2:<br>TWO PUCCH<br>Different TDMed PUCCH for unicast and multicast | Option 1:<br>One PUCCH TX<br>Joint coding for unicast and multicast<br>Separate encoding for unicast and multicast<br>Separate encoding for LP and HP<br>Separate encoding for unicast-LP, unicast-HP, and multicast-LP<br>Option 2:<br>Two PUCCHs<br>Different TDMed PUCCH for unicast and multicast<br>PUCCH 1: Individual unicast LP/HP<br>PUCCH 2: Multicast LP |

TABLE 7-continued

| ACK/NACK based multicast | Unicast HP or Multicast HP | Unicast LP or Multicast LP | Unicast HP and LP |
|---|---|---|---|
| | | | Different TDMed PUCCH for LP and HP<br>PUCCH 1: Joint unicast/multicast LP<br>PUCCH 2: Unicast HP |
| Multicast HP and LP | Option 1:<br>One PUCCH TX<br>Joint coding for unicast and multicast<br>Joint coding for two multicast HPs<br>Separate encoding for unicast HP and multicast HP<br>Separate encoding for LP and HP<br>Option 2:<br>Two PUCCHs<br>Different TDMed PUCCH for unicast and multicast<br>PUCCH 1: Unicast HP<br>PUCCH 2: Individual multicast LP/HP<br>Different TDMed PUCCH for LP and HP<br>PUCCH 1: Multicast LP<br>PUCCH 2: Joint Unicast/Multicast HP | Option 1:<br>One PUCCH TX<br>Joint coding for unicast and multicast<br>Joint coding for two multicast LPs<br>Separate encoding for unicast LP and multicast LP<br>Separate encoding for LP and HP<br>Option 2:<br>Two PUCCHs<br>Different TDMed PUCCH for unicast and multicast<br>PUCCHI: Unicast LP<br>PUCCH 2: Individual multicast LP/HP<br>Different TDMed PUCCH for LP and HP<br>PUCCH 1: Multicast HP<br>PUCCH 2: Joint unicast/multicast LP | Option 1:<br>One PUCCH TX<br>Joint coding for unicast and multicast<br>Separate encoding for unicast and multicast<br>Separate encoding for LP and HP<br>Separate encoding for unicast-LP, unicast-HP, multicast-HP, and multicast LP<br>Option 2:<br>Two PUCCHs<br>Different TDMed PUCCH for unicast and multicast<br>PUCCH 1: Individual unicast LP/HP<br>PUCCH 2: Individual multicast LP/HP<br>Different TDMed PUCCH for LP and HP<br>PUCCH 1: Joint unicast/multicast LP<br>PUCCH 2: Joint Unicast/Multicast HP |

The TDM transmission methods of the two PUCCHs performed in the same slot in Table 7 may be divided into method A and method B, which will be described later. The UE may transmit different TDMed PUCCH for LP and HP (Method A). Specifically, the UE may transmit a joint unicast/multicast HARQ-ACK for LP through PUCCH 1 as in Embodiment 1, and multiplex to transmit joint unicast/multicast HARQ-ACK to HP through PUCCH 2.

Here, when PUCCH 1 and PUCCH 2 collide with each other, the UE may construct a new HARQ-ACK codebook by separately coding the HARQ-ACK codebook of PUCCH 1 and the HARQ-ACK codebook of PUCCH 2. And, the UE may transmit a new HARQ-ACK codebook through PUCCH 3. Here, PUCCH 3 can be transmitted with PUCCH resources determined again based on the new HARQ-ACK codebook.

The UE may transmit different TDMed PUCCH for unicast and multicast (Method B). Specifically, as in Embodiment 2, the UE may transmit only unicast HARQ-ACK through PUCCH 1 and only multicast HARQ-ACK through PUCCH 2.

For example, a HARQ-ACK codebook constructed by separately coding LP unicast HARQ-ACK and HP unicast HARQ-ACK may be transmitted through PUCCH 1, and a HARQ-ACK codebook constructed by separately coding the LP multicast HARQ-ACK and the HP multicast HARQ-ACK may be transmitted through PUCCH 2.

At this time, if PUCCH 1 and PUCCH 2 collide with each other, the UE may configure a new HARQ-ACK codebook by separately coding the HARQ-ACK codebook of PUCCH 1 and the HARQ-ACK codebook of PUCCH 2. And, the UE may transmit a new HARQ-ACK codebook through PUCCH 3. Here, PUCCH 3 may be transmitted with PUCCH resources determined again based on the new HARQ-ACK codebook.

The base station may be configured to transmit ACK/NACK-based multicast HARQ-ACK and NACK-only-based multicast HARQ-ACK in different ways. For example, the base station may be configured to transmit ACK/NACK-based multicast HARQ-ACK in method A, and NACK-only-based multicast HARQ-ACK in method B.

FIG. 10 is a diagram for describing the signaling procedure of the network side and the UE according to an embodiment of the present disclosure.

FIG. 10 shows an example of signaling between a network side and a terminal (UE) in a situation where the embodiments (e.g., Embodiment 1, Embodiment 2, Embodiment 3, Embodiment 4, Embodiment 5, or a combination of one or more of the detailed Embodiments thereof) of the present disclosure described above may be applied.

Here, the UE/network side is exemplary and may be applied to various devices as described with reference to FIG. 11. FIG. 10 is for convenience of description, and does not limit the scope of the present disclosure. In addition, some step(s) shown in FIG. 10 may be omitted depending on circumstances and/or settings. In addition, in the operation of the network side/UE of FIG. 10, the above-described uplink transmission/reception operation etc. may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may enter RRC_CONNECTED mode and report a message indicating one or more interested MBS services to the network (S105).

Here, the UE may transmit the message to the network through at least one of a UCI, MAC CE (Control Element), and RRC message. And, the MBS service of interest in the message may mean one of TMGI or G-RNTI listed in the DL message received from the network side.

For example, the DL message may be a service availability message listing TMGI #1, TMGI #3, TMGI #5, and TMGI #10. If the UE is interested in TMGI #5, the UE may indicate the order of TMGI #5 in the message. That is, the UE may report '3' to the network.

As another example, the DL message may be a service availability message listing G-RNTI #1, G-RNTI #3, G-RNTI #5, and G-RNTI #10. If the UE is interested in G-RNTI #10, the UE may indicate the order of G-RNTI #10 in the message. That is, the UE may report '4' to the network.

For example, the operation of the UE (100 or 200 in FIG. 11) in step S105 described above to transmit the message to the network side (200 or 100 in FIG. 11) may be implemented by the device in FIG. 11, which will be described below. For example, referring to FIG. 11, one or more processors 102 may control one or more transceivers 106 and/or one or more memories 104 to transmit the message, and one or more transceivers 106 may transmit the message to the network.

Upon receiving the message, the network side may transmit configuration information to the UE via an RRC message (S110).

For example, the configuration information may include search space configuration information including CFR (common frequency resource) configuration information, one or more group common PDSCH configurations information including TCI state for one or more G-RNTI values, and TCI status for one or more G-RNTI values.

Here, the RRC message may be a group common message transmitted through a PTM Multicast Control Channel (MCCH) or a UE-specific message transmitted through a UE-specific Dedicated Control Channel (DCCH).

And, CFR may include DL CFR and UL CFR. For example, one DL CFR may provide group common PDCCH and group common PDSCH transmission resources for MBS transmission and reception. One UL CFR may provide HARQ-ACK PUCCH resources for group common PDSCH reception. One CFR may be one MBS-specific BWP or one UE-specific BWP. Additionally or alternatively, one or multiple CFRs may be set within one UE-specific BWP. One CFR may have a connection relationship with one terminal-specific BWP.

The UE may be configured with at least a G-RNTI value for each MBS CFR or each serving cell. GC-CS-RNTI may be configured/used to activate (or enable), retransmit or release one or more group common SPS configurations.

If it is not configured with CFR for the UE or GC-CS-RNTI for the serving cell, and CS-RNTI is configured for the CFR or serving cell, the UE may use the CS-RNTI to activate, retransmit, or release one or more group common SPS configurations.

The network side may associate a TMGI list or a G-RNTI list with one GC-CS-RNTI value. At this time, the network side may provide a TMGI list or a G-RNTI list associated with the GC-CS-RNTI value.

Additionally, the configuration information (e.g., 'PDSCH-config') of each PDSCH may be configured as shown in Table 8 with the minimum information elements for multicast and/or broadcast.

TABLE 8

```
PDSCH-Config ::= SEQUENCE {
dataScramblingIdentityPDSCH INTEGER (0..1023) OPTIONAL, --
Need S
dmrs-DownlinkForPDSCH-MappingTypeA SetupRelease { DMRS-
DownlinkConfig }
OPTIONAL, -- Need M
dmrs-DownlinkForPDSCH-MappingTypeB SetupRelease { DMRS-
DownlinkConfig }
OPTIONAL, -- Need M
tci-StatesToAddModList SEQUENCE (SIZE(1..maxNrofTCI-States))
OF TCI-State
OPTIONAL, -- Need N
tci-StatesToReleaseList SEQUENCE (SIZE(1..maxNrofTCI-States))
OF TCI-StateId
OPTIONAL, -- Need N
vrb-ToPRB-Interleaver ENUMERATED {n2, n4} OPTIONAL, --
Need S
resourceAllocation ENUMERATED { resourceAllocationType0,
resourceAllocationType1,
dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, --
Need S
rateMatchPatternToAddModList SEQUENCE (SIZE
(1..maxNrofRateMatchPatterns)) OF
RateMatchPattern OPTIONAL, -- Need N
rateMatchPatternToReleaseList SEQUENCE (SIZE
(1..maxNrofRateMatchPatterns)) OF
RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, --
Need S
maxNrofCodeWordsScheduledByDCI ENUMERATED {n1, n2}
... }
```

For example, the operation of the UE (100 or 200 in FIG. 11) in step S110 described above receiving the configuration information from the network side (200 or 100 in FIG. 11) may be implemented by the device in FIG. 11, which will be described below. For example, referring to FIG. 11, one or more processors 102 may control one or more transceivers 106 and/or one or more memories 104 to receive the configuration information, and one or more transceivers 106 may receive the configuration information from a network side. The UE may receive control information from the network (S115). For example, the UE may receive downlink control information (DCI) for scheduling/activating/deactivating uplink/downlink from the network side.

Specifically, if a search space is configured for the configured CFR, the UE may receive CRC scrambled DCI with G-RNTI or G (group)-CS (configured scheduling)-RNTI by monitoring the PDCCH in the SS (search space) set in the configured CFR.

For example, the operation of the UE (100 or 200 in FIG. 11) in step S115 described above receiving the control information from the network side (200 or 100 in FIG. 11) may be implemented by the device in FIG. 11, which will be described below. For example, referring to FIG. 11, one or more processors 102 may control one or more transceivers 106 and/or one or more memories 104 to receive the control information, and one or more transceivers 106 may receive the control information from a network side.

The UE may receive TB from the network side (S120).

Specifically, if a data unit is available on the MTCH of the MBS radio bearer (MRB) for the MBS service, the network side may include a data unit for the SPS PDSCH occasion associated with the MTCH of the MRB for the MBS service, or associated with the TMGI of the MBS service, or associated with the short ID of the MBS service, or may construct the TB associated with the G-RNTI mapped to the MBS service according to the service-to-resource mapping and transmit it to the UE.

For group common dynamic scheduling of TB, the network side may transmit DCI to the UE through PDCCH. The DCI may be CRC scrambled by G-RNTI, G-CS-RNTI, or CS-RNTI. PDCCH may be implemented as a group common PDCCH or a UE-specific PDCCH.

For example, the DCI may include at least one of identifier for DCI format, carrier indicator, bandwidth part indicator, Frequency domain resource assignment, time domain resource allocation, VRB-to-PRB mapping, PRB bundling size indicator, rate matching indicator, ZP CSI-RS trigger, MCS, NDI, RV, HARQ process number, downlink allocation index, TPC command for scheduled PUCCH, PUCCH resource indicator, PDSCH-to-HARQ_feedback timing indicator, antenna port, transmission setup indication, SRS request, DMRS sequence initialization, priority indicator.

For group common dynamic scheduling, by group common or UE specific RRC message or by group common or UE specific MAC CE, the network side may provide the UE with one or more service-resource mappings for MBS services identified by TMGI or G-RNTI or GC-CS-RNTI. Data of the MBS service may be carried through the MBS radio bearer (MRB) of the multicast traffic logical channel, that is, the MTCH associated with the MBS service. The RRC message may be a group common message transmitted through a PTM Multicast Control Channel (MCCH) or a UE-specific message transmitted through a UE-specific Dedicated Control Channel (DCCH). The DCI scheduling PDSCH carrying MBS service data may also indicate one or more of a short ID, MTCH ID, MRB ID, G-RNTI value, and TMGI value for the MBS service.

When the UE receives the CRC scrambled DCI by the G-RNTI it wants to receive, the UE may determine the MBS service(s) associated with one or more of the short ID, MTCH ID, MRB ID, G-RNTI value, and TMGI value for each PDSCH occasion, based on the mapping between the MBS service indicated in the DCI and the HPN and/or the mapping between the MBS service indicated in the DCI and the short ID(s).

Then, if the UE is interested in the determined MBS service(s), the UE may receive the PDSCH transmission scheduled by the DCI. If the UE is not interested in the determined MBS service(s), the UE may not receive the PDSCH transmission scheduled by DCI.

For example, the operation of the UE (100 or 200 in FIG. 11) in step S120 described above to receive the TB from the network side (200 or 100 in FIG. 11) can be implemented by the device in FIG. 11, which will be described below. For example, referring to FIG. 11, one or more processors 102 may control one or more transceivers 106 and/or one or more memories 104 to receive the TB, and one or more transceivers 106 may receive the TB from a network side.

Upon receiving the group common DCI indicating the PUCCH resource for MBS HARQ-ACK, the UE may transmit HARQ-ACK through the PUCCH after receiving the PDSCH scheduled by the DCI (S125). That is, depending on the decoding state of PDSCH transmission, the UE may transmit HARQ feedback to the network.

For PTM scheme 1, the group common DCI may indicate a single PUCCH resource indicator and a single PDSCH-to-HARQ_feedback timing indicator at least for ACK/NACK-based HARQ-ACK.

Specifically, in the case of UE-specific PUCCH resource allocation for ACK/NACK-based HARQ-ACK for group common DCI, Other UEs in the group may be configured to a different value of at least 'PUCCH-Resource' and 'dl-DataToUL-ACK' in the UE-specific 'PUCCH-config' for multicast or unicast (unless 'PUCCH-config' for multicast is configured). Different PUCCH resources may be allocated to different UEs by the same PUCCH resource indicator and the same PDSCH-to-HARQ_feedback timing indicator of the group common DCI.

For PTP retransmission, in a UE-specific DCI, the PUCCH resource indicator and PDSCH-to-HARQ_feedback timing indicator may be interpreted based on 'PUCCH-config' for unicast regardless of whether 'PUCCH-config' for multicast is configured.

Here, PRI (PUCCH Resource Indicator) may be indicated by the group common DCI, as will be described later.

As an example, a UE-specific PRI list may be included in the DCI (Option 1A-1). Each PRI in that list may indicate an entry corresponding to the candidate 'pucch-ResourceId' value of 'PUCCH-config' for allocation of the same PUCCH resource or different PUCCH resources for different UEs in the group that received the same DCI. Different PRIs in the DCI can point to different entries in 'PUCCH-config'.

Here, the candidate 'pucch-ResourceId' value may be configured by RRC, and a different 'pucch-ResourceId' value may be configured for other UEs of the same group at least in multicast 'PUCCH-config'.

As another example, a group common PRI may be included in the DCI (Option 1A-2). A single group common PRI may indicate a specific entry for a candidate 'pucch-ResourceId' value in the UE-specific 'PUCCH-config' for allocation of the same or different PUCCH resources for all UEs in the group.

And, the candidate 'pucch-ResourceId' value may be configured by RRC. At least in 'PUCCH-config' for multicast, different 'pucch-ResourceId' values may be configured for different UEs in the same group.

If 'PUCCH-config' for multicast is configured with HARQ-ACK to group common PDSCHs scheduled by group common DCI, the UE may assume that the PRI of the group common DCI indicates an entry corresponding to the candidate 'pucch-ResourceId' value of 'PUCCH-config' for multicast.

If 'PUCCH-config' for multicast is configured with HARQ-ACK to group common PDSCHs scheduled by group common DCI, the UE may assume that the PRI of the group common DCI indicates an entry corresponding to the candidate 'pucch-ResourceId' value of 'PUCCH-config' for multicast.

K1 (PDSCH-to-HARQ_feedback timing indicator) may be indicated by the group common DCI, as will be described later.

As an example, a list of UE-specific K1 values may be included in the DCI (Option 1B-1). Each K1 in the list may indicate the same UL slot or a different UL (sub) slot for other terminals in the group.

For example, different K1 values are assigned to different UEs. That is, a K1 value may be assigned to UE 1, a K2 value may be assigned to UE 2, and a K3 value may be assigned to UE 3.

As another example, the K1 value may be shared by multiple UEs. For example, UE 1 and UE 2 may share the K1 value, and UE 3 and UE 4 may share the K2 value.

As another example, one K1 value may be a reference, and another K1 value may be assigned based on that reference. {List of K1_ref, K1_offset} may be indicated in DCI.

For example, UE 1 may use K1_ref, UE 2 may use K1_ref+K1_offest1, and UE 3 may use K1_ref+K1_offest2.

As another example, a group common K1 value may be included in the DCI (Option 1B-2). For example, a single K1 value may be the same for all UEs in a group receiving DCI, or may indicate a corresponding entry for the candidate 'dl-DataToUL-ACK' value in the UE-specific 'PUCCH-config' for different PUCCH resource allocation. This can be applied when the DCI format is configured in the UE-specific 'PUCCH-config' for the K1 value.

As another example, the candidate 'dl-DataToUL-ACK' value is configured by RRC and may be configured differently for other UEs of the same group at least in 'PUCCH-config' for multicast.

As another example, if 'PUCCH-config' for multicast is configured for HARQ-ACK for grouping common PDSCH scheduled by group common DCI, the UE may assume that the K1 value of the group common DCI indicates the corresponding entry for the candidate 'dl-DataToUL-ACK' value in 'PUCCH-config' for multicast.

As another example, if 'PUCCH-config' for multicast is not configured for HARQ-ACK to group common PDSCH scheduled by group common DCI, the UE may assume that the K1 value of the group common DCI indicates an entry corresponding to the candidate 'dl-DataToUL-ACK' value in 'PUCCH-config' for unicast.

In addition, upon receiving the group common DCI CRC scrambled by the G-RNTI and/or the terminal-specific DCI CRC scrambled by the C-RNTI, if Type-1 HARQ-ACK codebook is configured for 'PUCCH-config' for multicast and/or 'PUCCH-config' for unicast, the UE may configure TDRA (Time Domain Resource Allocation) to generate a type-1 HARQ-ACK codebook for HARQ-ACK(s) to group common PDSCH scheduled by group common DCI and/or UE-specific PDSCH scheduled by UE-specific DCI.

If TB decoding is not successful in the PDSCH transmission occasion, the UE may transmit HARQ NACK to the base station through PUCCH resources in the configured UL CFR.

By using PUCCH resources, the UE may transmit HARQ-ACK to other PDSCH transmissions, such as unicast SPS PDSCH, dynamic unicast PDSCH, PTP retransmission, and/or dynamic group common PDSCH.

Here, to multiplex HARQ-ACK on PUCCH in (sub) slots for SPS PDSCH for multicast, SPS PDSCH for unicast, dynamically scheduled multicast PDSCH and/or dynamically scheduled unicast PDSCH, the UE may construct a codebook based on one or more of the above-described options.

If the RSRP threshold is configured, the UE may use NACK-only based HARQ-ACK based NACK based on the RSRP of the measured serving cell. If the measured RSRP is higher than the threshold, NACK-only-based HARQ-ACK may be transmitted through the group common PUCCH resource indicated by the DCI's PRI. If the measured RSRP is lower than the threshold, NACK-only-based HARQ-ACK can be changed to ACK/NACK-based HARQ-ACK on the UE-specific PUCCH resource indicated by the PRI of the DCI.

Meanwhile, when 'pdsch-AggregationFactor' is configured for G-RNTI or 'repeat_number' is indicated by DCI from the network side, TB scheduled by group common DCI, if configured, may be repeated for the Nth HARQ transmission of the TB within each symbol allocation between each 'pdsch-AggregationFactor' consecutive slot or between each 'repeat_number' consecutive slot.

For example, the operation of the UE (100 or 200 in FIG. 11) in step S125 described above to transmit the HARQ-ACK from the network side (200 or 100 in FIG. 11) may be implemented by the device in FIG. 11, which will be described below. For example, referring to FIG. 11, one or more processors 102 may control one or more transceivers 106 and/or one or more memories 104 to transmit the HARQ-ACK, and one or more transceivers 106 may transmit the HARQ-ACK from a network side.

The network side that has received the HARQ NACK in the TCI state may retransmit the PDCCH and PDSCH using the TCI state in the DL CFR configured for retransmission of the TB (S130).

The UE may monitor the group common and/or UE-specific PDCCH using the TCI state for the search space configured in the DL CFR to receive retransmission of the TB. The network side may retransmit the TB to one of the UEs in the group by UE-specific PDCCH. However, since the other UE successfully received the TB, it may not receive the TB retransmission.

When the UE receives the PDCCH for retransmission of the TB, the UE may receive the PDSCH scheduled by the DCI of the PDCCH. If the UE successfully decodes TB from PDSCH, the UE may consider the decoded TB to be associated with short ID for MTCH, MRB, TMGI, G-RNTI and/or MBS services based on the mapping between the MBS service indicated by the DCI and the HPN (HARQ process number), and/or the mapping between the MBS service indicated by the DCI and the short ID(s).

If TB decoding is successful at the PDSCH transmission occasion, the UE may transmit HARQ ACK to the network through PUCCH resources in the UL CFR configured according to the above-described procedure. Using the PUCCH resource, the UE may transmit HARQ-ACK to other PDSCH transmissions, such as unicast SPS PDSCH, dynamic unicast PDSCH, PTP retransmission, and/or dynamic group common PDSCH.

In this case, to multiplex HARQ-ACK on PUCCH in (sub) slots for SPS PDSCH for multicast, SPS PDSCH for unicast, dynamically scheduled multicast PDSCH and/or dynamically scheduled unicast PDSCH, the UE may construct a codebook based on one or more of the options/embodiments described above.

For example, the operation of the UE (100 or 200 in FIG. 11) in step S130 described above receiving a TB retransmission from the network side (200 or 100 in FIG. 11) may be implemented by the device in FIG. 11, which will be described below. For example, referring to FIG. 11, one or more processors 102 may control one or more transceivers 106 and/or one or more memories 104, etc. to receive the TB retransmission, and one or more transceivers 106 may receive the TB retransmission from a network side.

General Device to which the Present Disclosure May be Applied

FIG. 11 illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, the processor 102 may process the information in the memory 104 to generate first information/signal and then transmit a wireless signal including the first information/signal through the transceiver 106. Additionally, the processor 102 may receive a wireless signal including the second information/signal through the transceiver 106 and then store information obtained from signal processing of the second information/signal in the memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, a first physical downlink shared channel (PDSCH) including an initial transport block (TB) scheduled by a first multicast downlink control information (DCI) format;

transmitting, by the UE to the base station, a first physical uplink control channel (PUCCH) including a first hybrid automatic repeat and request-acknowledgement (HARQ-ACK) codebook in response to the first PDSCH;

receiving, by the UE from the base station, a second PDSCH including the initial TB scheduled by a first unicast DCI format; and transmitting, by the UE to the base station, a second PUCCH including a second HARQ-ACK codebook, wherein the second HARQ-ACK codebook includes (i) a third HARQ-ACK codebook related to at least one unicast DCI format including the first unicast DCI format and (ii) a fourth HARQ-ACK codebook related to at least one multicast DCI format including the first multicast DCI format.

2. The method of claim 1, wherein:

the second HARQ-ACK codebook is configured using first HARQ-ACK information for the second PDSCH, the third HARQ-ACK codebook includes second HARQ-ACK information for a second unicast DCI format included in the at least one unicast DCI format, and a priority of the first HARQ-ACK information and a priority of the second HARQ-ACK information are same.

3. The method of claim 1, wherein:

the fourth HARQ-ACK codebook includes third HARQ-ACK information for the first multicast DCI format and fourth HARQ-ACK information for a second multicast DCI format.

4. The method of claim 3, wherein:

each of the third HARQ-ACK information and the fourth HARQ-ACK information corresponds to an individual group (G)-Radio Network Temporary Identifier (RNTI) value.

5. The method of claim 3, wherein:

a priority of the third HARQ-ACK information and a priority of the fourth HARQ-ACK information are same.

6. The method of claim 3, wherein:

the third HARQ-ACK information includes only a negative acknowledgment (NACK) value or at least one of an ACK value or a NACK value.

7. A user equipment (UE) comprising:

at least one transceiver; and at least one processor coupled to the at least one transceiver;

wherein the at least one processor is configured to:

receive, from a base station through the at least one transceiver, a first physical downlink shared channel (PDSCH) including an initial transport block (TB) scheduled by a first multicast downlink control information (DCI) format;

transmit, to the base station through the at least one transceiver, a first physical uplink control channel (PUCCH) including a first hybrid automatic repeat and request-acknowledgement (HARQ-ACK) codebook in response to the first PDSCH;

receive, from the base station through the at least one transceiver, a second PDSCH including the initial TB scheduled by a first unicast DCI format; and transmit, to the base station through the at least one transceiver, a second PUCCH including a second HARQ-ACK codebook, wherein the second HARQ-ACK codebook includes (i) third HARQ-ACK codebook related to at least one unicast DCI format including the first unicast DCI format and (ii) a fourth HARQ-ACK codebook related to at least one multicast DCI format including the first multicast DCI format.

8. A base station comprising:

at least one transceiver; and at least one processor coupled to the at least one transceiver, wherein the at least one processor is configured to:

transmit, to a user equipment (UE) through the at least one transceiver, a first physical downlink shared channel (PDSCH) including an initial transport block (TB) scheduled by a first multicast downlink control information (DCI) format;

receive, from the UE through the at least one transceiver, a first physical uplink control channel (PUCCH) including a first hybrid automatic repeat and request-acknowledgement (HARQ-ACK) codebook in response to the first PDSCH;

transmit, to the UE through the at least one transceiver, a second PDSCH including the initial TB scheduled by a first unicast DCI format;

receive, from the UE through the at least one transceiver, a second PUCCH including a second HARQ-ACK codebook, wherein the second HARQ-ACK codebook includes (i) a third HARQ-ACK codebook related to at least one unicast DCI format including the first unicast DCI format and (ii) a fourth HARQ-ACK codebook related to at least one multicast DCI format including the first multicast DCI format.

* * * * *